United States Patent [19]

Campbell, Jr. et al.

[11] 4,377,072
[45] Mar. 22, 1983

[54] CERAMIC HEAT EXCHANGE MODULE AND APPARATUS AND PROCESS UTILIZING SAME

[75] Inventors: John Campbell, Jr., Woodland Hills; Larry H. Russell, Agoura; Philip I. Robinson, Calabasas, all of Calif.

[73] Assignee: Rockwell International Corporation, El Segundo, Calif.

[21] Appl. No.: 200,635

[22] Filed: Oct. 27, 1980

[51] Int. Cl.³ ............................................. F01K 25/00
[52] U.S. Cl. .............................. 60/682; 165/104.16; 165/145; 431/170
[58] Field of Search ................ 431/170, 328; 122/221; 165/104.16, 145, 150, 176; 60/650, 682

[56] References Cited

U.S. PATENT DOCUMENTS

| | | | |
|---|---|---|---|
| 2,428,768 | 10/1947 | Bertram | 122/459 |
| 2,494,767 | 1/1950 | Lindsay | 159/27 |
| 2,931,711 | 4/1960 | Walker | 422/146 |
| 3,833,851 | 9/1974 | Frank | 422/146 |
| 3,842,904 | 10/1974 | Gardenier | 165/145 |
| 3,982,901 | 9/1976 | Steever et al. | 165/104.16 X |
| 4,096,909 | 6/1978 | Jukkola | 165/104.16 X |
| 4,183,213 | 1/1980 | Rao | 60/517 |

Primary Examiner—Allen M. Ostrager
Assistant Examiner—Stephen F. Husar
Attorney, Agent, or Firm—H. Fredrick Hamann; Harry B. Field

[57] ABSTRACT

There is provided a ceramic heat exchange module 10 having fluid inlet and outlet conduits (12,20) extending from one side of horizontal manifolds (14,18). Serpentine tubes 16 extend from the opposed sides and connect the manifolds. In use, in a fluidized bed combustor 22, the manifolds are positioned between the base 30 and air inlets 32. Serpentine tubes extend into the fluidized bed 36, the fluid inlet and outlet conduits extend through the base for coupling to a working fluid supply.

20 Claims, 6 Drawing Figures

CERAMIC HEAT EXCHANGE MODULE AND APPARATUS AND PROCESS UTILIZING SAME

BACKGROUND OF THE INVENTION

It has been proposed to utilize atmospheric fluidized bed combustors operating in series to provide a working fluid for closed-cycle gas turbine power generation systems at a temperature of 1700° F. or higher. A working fluid, e.g., air, at temperatures of about 1500° F. can be obtained by inserting conventional metal heat exchange surfaces in a fluidized bed operating at 1600° to 1700° F. Heating the working fluid to a final temperature above about 1700° F. in fluidized beds which operate at 1850° to 2000° F. requires the use of ceramic surfaces (which lack ductility), in the fluidized bed.

A need therefore exists for an effective indirect heat exchange system for use in fluidized bed combustion zones.

SUMMARY OF THE INVENTION

According to the present invention, there is provided a novel ceramic heat exchange module, and a fluidized bed combustor employing such ceramic heat exchange modules for use in a method of heating working fluid from about 1500° to 1750° F.

The ceramic heat exchange modules of the instant invention comprise a ceramic vertically-oriented fluid inlet conduit coupled in open flow communication with a ceramic horizontally-oriented inlet manifold which is substantially parallel to a ceramic horizontally-oriented outlet manifold and coupled thereto in flow communication by a plurality of vertically-oriented ceramic heat exchange tubes, preferably of serpentine configuration. The tubes are preferably contained in planes substantially parallel to each other and are substantially normal to a plane formed by the longitudinal inlet and outlet manifolds. The outlet manifold is connected to a ceramic vertically-oriented fluid outlet conduit. Fluid flow is from the inlet conduit to the inlet manifold, through the tubes, to the outlet manifold, and outwards from the outlet conduit.

In use, the ceramic fluid inlet and outlet conduits are inserted through the interior surface of the fluidized bed combustion chamber and respectively coupled to external metal manifolds supplying the working fluid, e.g., air, and to external metal manifolds which conduct the heated working fluid away from the fluidized bed combustion chamber. In the fluidized bed combustion chamber, the inlet and outlet manifolds of the ceramic heat exchange modules are positioned below the air inlets, or tuyeres, in a compliant, stagnant zone of ash and other solids. Only the ceramic heat exchange tubes extend upwards into the combustion zone of the fluidized bed. This minimizes mechanical and thermal stresses. The ceramic heat exchange modules are adapted to be installed and removed as a unit and provide a minimum of ceramic-to-metal joints, which joints are moreover external of the fluidized bed for ready access.

A fluidized bed combustor employing the ceramic heat exchange modules of the invention comprises an insulated chamber having an upper portion and a lower portion for containing the fluidized bed and means to inject carbonaceous fuel, i.e., coal, to be combusted, and tuyeres for injection of combustion air. For effective operation, the system includes an economizer zone contained in the upper portion and comprising a multiplicity of coils, preferably used for indirectly heating the working fluid, i.e., air, prior to feed of the working fluid to the ceramic heat exchange modules. Beneath the insulated base of the chamber, there are provided manifolds for supplying air to the tuyeres, and manifolds supplying the working fluid to the ceramic heat exchange modules of the invention, as well as means, e.g., manifolds, for supplying and removing a high-temperature working fluid heated by passage through the ceramic heat exchange modules of this invention. In this construction, the vertically-oriented inlet and outlet conduits of the ceramic heat exchange module extend downwards through the base of the fluidized bed combustion chamber and are coupled to the external metal manifolds by ceramic-to-metal seals. The inlet and outlet manifolds of the ceramic heat exchange module are positioned between the air inlets and the upper interior surface of the base of the fluidized bed combustion chamber. The ceramic heater tubes extend vertically upwards into the fluidized bed from the inlet manifold to the outlet manifold, and enable heating of the working fluid flowing therethrough by transfer of heat of combustion of particulate carbonaceous material in the zone above the air inlets. The heated fluid enters the outlet manifolds of the ceramic heat exchange modules positioned between the air inlets and the base, and from the outlet manifold passes through the outlet conduits to an external metal manifold.

In use, the working fluid at a temperature of about 1500° F. is distributed by metal external manifolds to the ceramic inlet conduits of the plurality of the ceramic heat exchange modules, and passes upwards through the ceramic inlet conduits extending through the insulated base of a fluidized bed combustion zone to an inlet manifold through a plurality of heat exchange tubes connecting the ceramic inlet manifold to the ceramic outlet manifold, and passes by the ceramic outlet conduits from the outlet manifold, through the base of the fluidized bed combustion zone, to external manifolds provided for conducting the heated working fluid from the fluidized bed combustion zone at a temperature of about 1700° F.

Preferably, a portion of the working fluid is heated by passage through an economizer zone positioned above the fluidized bed where combustion occurs.

DETAILED DESCRIPTION

Figures 1, 1A:
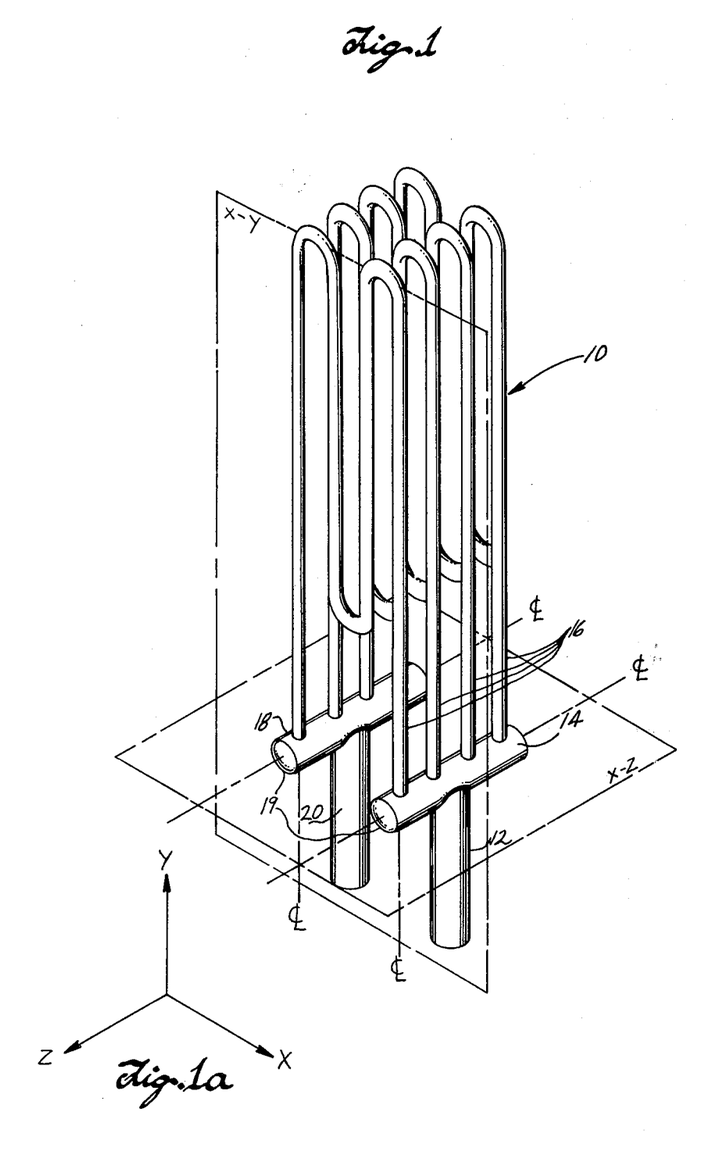
FIG. 1 illustrates the preferred construction of the ceramic heat exchange modules of this invention.
FIG. 1(a) provides reference axis for a detailed description of the elements of the ceramic heat exchange modules.

With reference now to FIGS. 1 and 1(a), the ceramic heat exchange modules of the invention 10 comprise a vertically-oriented ceramic fluid inlet conduit 12 coupled to a horizontally-oriented first manifold 14, in open communication with conduit 12. The axis, or centerline, of the fluid inlet conduit is normal to the longitudinal axis, or centerline ( ), of manifold 14, which is parallel to the "z" axis of FIG. 1(a). Extending from manifold 14 are a plurality of ceramic conduits 16, preferably in substantially parallel planes with respect to each other, and preferably of tubular, serpentine configuration. The conduits extend to an outlet manifold 18, similar in construction to inlet manifold 14 and substantially parallel thereto. A vertically-oriented outlet conduit 20 is parallel to inlet conduit 12 and coupled to outlet manifold 18. The ends 19 of manifolds 14 and 18 are closed. In the unit, the centerlines ( ) of the conduits coupling the manifolds 14 and 18 are preferably in the "x-y" plane, and normal to the "x-z" plane containing the centerlines of manifolds 14 and 18. In the serpentine construction, all bends are above the "x-z" plane common to the centerlines of the inlet and outlet manifolds. The ceramic heat exchange modules are readily factory assembled and usable as a unit for insertion in a fluidized bed combustor as herein described.

In the presently preferred construction, the modules are about 5 feet high by 12 inches wide by 12 inches deep. The ceramic tubes are about 1.5 inches O.D., with walls approximately ⅛-inch thick. They are preferably constructed of silicon carbide in the form of siliconized silicon carbide, sintered silicon carbide, or chemical vapor deposited silicon carbide.

The modules provide a minimum of ceramic-to-metal connections, i.e., two for every four heat exchange conduits 16, and offer in the preferred configuration a minimum of thermal stresses and substantially self-supporting conduits 16. Tube hangers, such as a suitably grooved "cap" (not shown), may be employed to prevent, in use in higher velocity applications, tube vibration. If used, tube hangers are also of ceramic construction.

Figure 2:
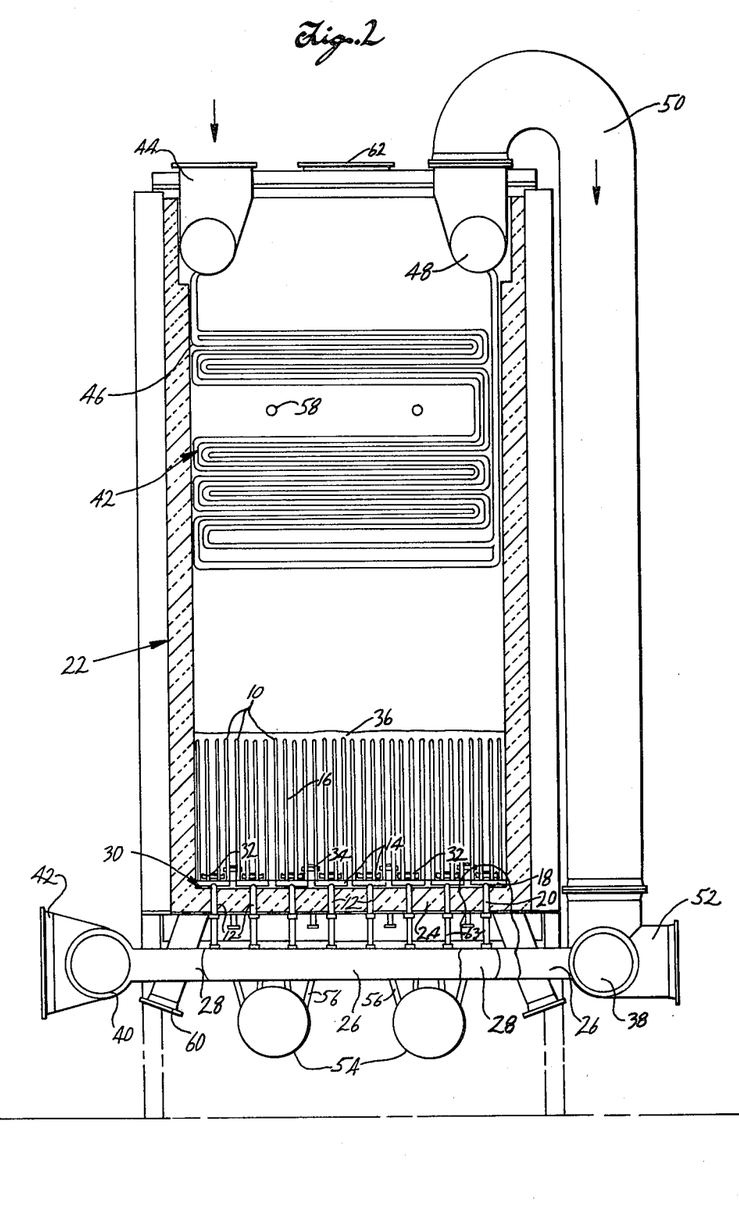
FIGS. 2, 3, and 4 provide respectively end, side, and top views of a fluidized bed combustor employing as elements thereof the ceramic heater modules of the invention.
Figure 3:
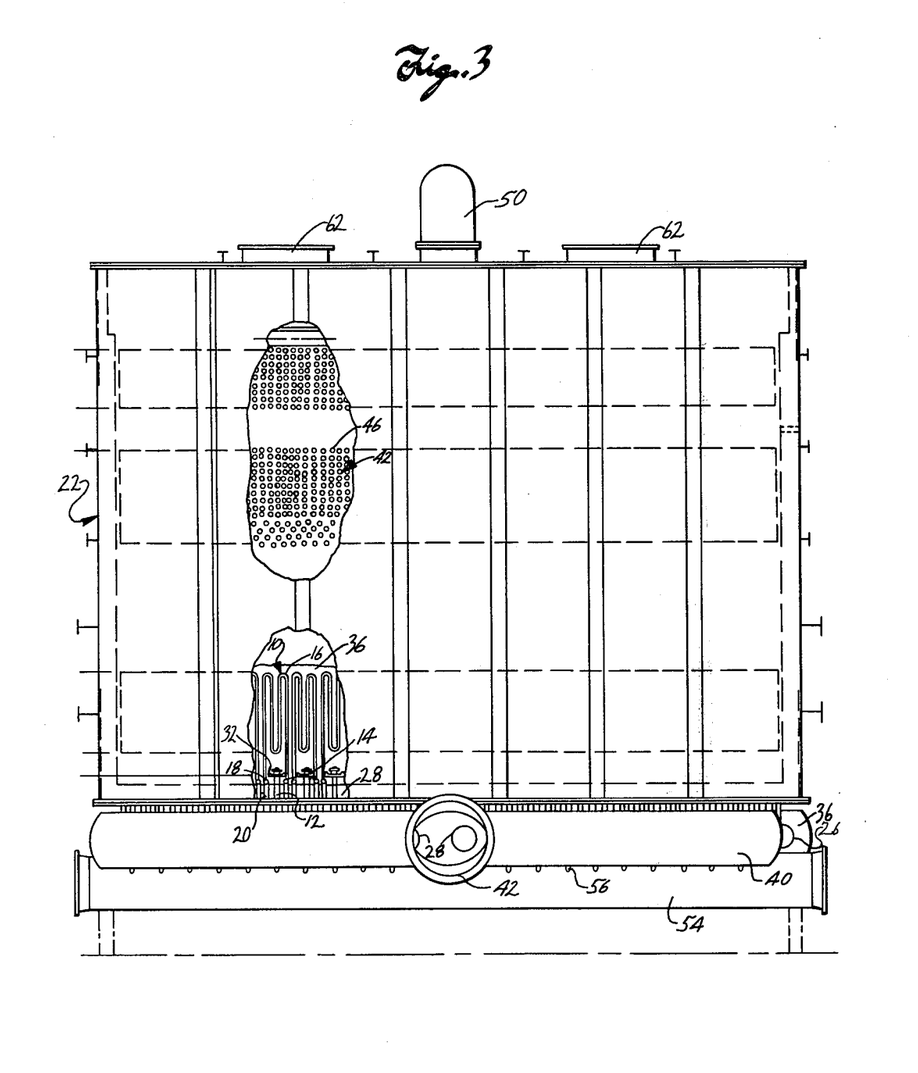
Figure 4:
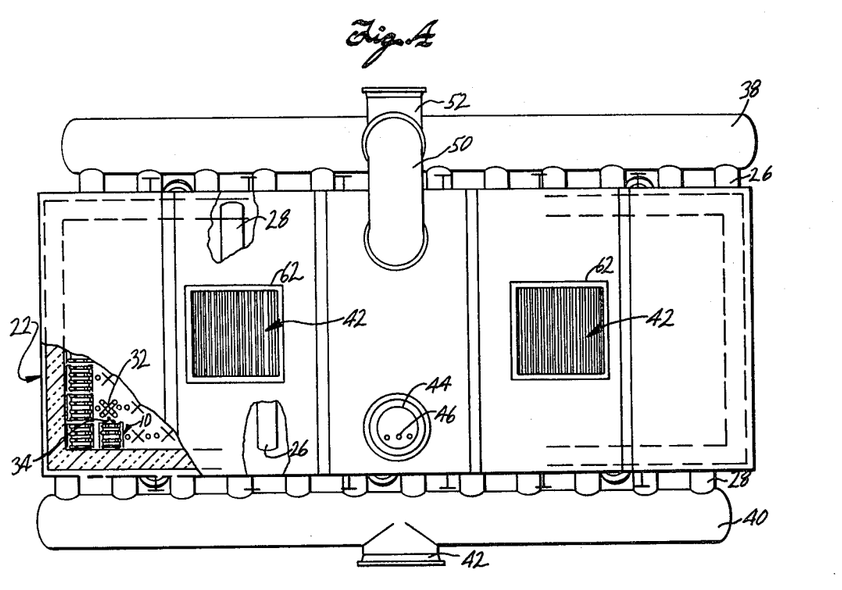

FIGS. 2, 3, and 4 illustrate in detail a high-temperature fluidized bed combustor 22 employing the novel ceramic heat exchange modules. With reference thereto, the ceramic heat exchanger modules 10 are installed internal of combustor 22. Conduits 12 and 20 extend through base 24 of ceramic-lined combustion chamber 22 from their respective manifolds 14 and 18 and couple to metal working fluid inlet manifolds 26 and outlet manifolds 28 by ceramic-to-metal seals. The inlet and outlet manifolds 14 and 18 are positioned at or between interior surface 30 and air inlets, or tuyeres, 32, as well as below the fuel inlets 34. Tubes 16 extend vertically from the inlet manifold 14 into the fluidized bed 36 in a preferably serpentine configuration and return to outlet manifolds 18. The working fluid, typically air, is supplied to manifolds 26 from duct 38 and, after passing through ceramic heat exchanger modules 10, is conducted away by manifolds 28 and by duct 40 to outlet 42.

In the system illustrated, at least a portion of the working fluid, usually about 10%, is supplied to the economizer zone 42 through inlet 44 and, after passage through tubes 46, to manifold 48 and then by duct 50 to duct 38. The balance of the inlet working fluid enters by inlet 52.

Also included as part of the combustor 24 are the combustion air supply ducts 54, with conduits 56 feeding tuyeres 32, soot blower ports 58, solids drains 60, and exhaust ducts 62. Also provided about inlet and outlet conduits 12 and 20 are metal jackets 63 which retain the ceramic fragments should bursting occur.

Figure 5:
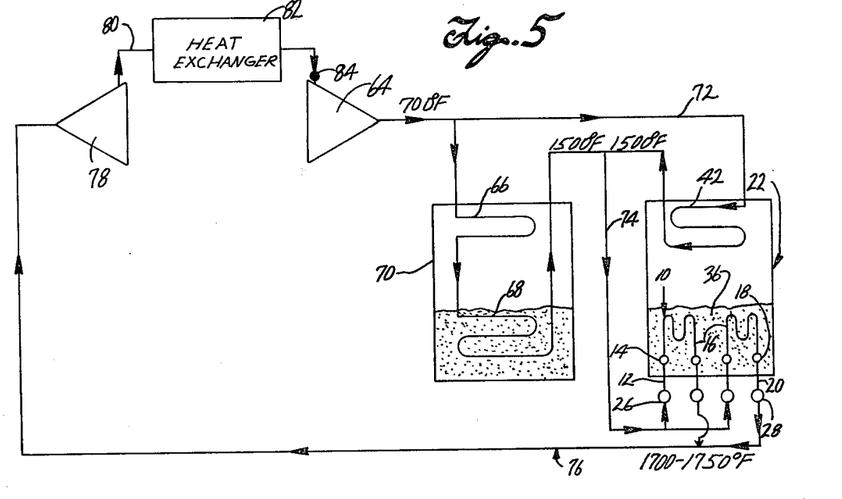
FIG. 5 is a simplified schematic illustration of a closed-circuit gas turbine power generation system employing in one of the fluidized bed combustion zones the ceramic heater modules of the instant invention.

FIG. 5 illustrates, in schematic fashion, the interrelationship of atmospheric fluidized bed combustors to the operation of a closed-cycle gas turbine power generation system. With reference thereto, the working fluid (air), exiting compressor 64 at about 700° F., is split. About 90% passes through economizer loop 66, and in bed tubes 68 of fluidized bed combustor 70 which operates at a bed temperature of about 1600° to 1700° F., and leaves at about 1500° F. The balance is passed by line 72 through economizer loop 42 of fluidized bed combustor 22 and joins the working fluid from fluidized bed combustor 70, at a temperature of about 1500° F. The partially heated working fluid passes by line 74 to manifolds 26, then by inlet conduits 12 to inlet manifolds 14 of ceramic heat exchangers 10, contained in fluidized bed 36, and through tubes 16 to outlet manifolds 18 and by outlet conduits 20 to outlet manifolds 28 and then, at a temperature of about 1700° F. to 1750° F., and at a typical pressure of 500 psig or more, by line 76 to expansion turbine 78. The fluid is expanded in turbine 78 for production of useful energy. Bed 36 is typically at a temperature of from about 1850° to about 2000° F. The exhaust from turbine 78 passes by line 80 to heat exchanger 82 for the production of more useful energy, and then by line 84 to compressor 64 for reintroduction to the closed loop.

In operation, a particulate solid carbonaceous fuel, such as coal, alone or, if required, a sulfur acceptor where the carbonaceous fuel contains bound sulfur, is introduced through fuel ports 34 and air introduced by manifolds 54 and lines 56 to tuyeres 32. Tuyeres 32 are above manifolds 14 and 18 of the ceramic heat exchange unit 10. In the zone between them is a compliant, queiscent mass of ash and solids, which are of essentially constant temperature so as to minimize mechanical and thermal stresses on conduits 12 and 20, as well as manifolds 14 and 18. All of the tubes 16 rise up into fluidized bed 36, where combustion of the carbonaceous material occurs. The amount of air introduced controls the combustion temperature. The products of combustion pass coils 46 of economizer 42 and outward through exhaust 62.

The ceramic heat exchange modules provided in accordance with the instant invention are capable of operating at high fluid working exit temperatures, and resist the fatigue and corrosive conditions existing at the temperatures of operation, which should be highly deleterious to use of metal indirect heat exchange surfaces. The stresses induced by thermal growth are minimized by positioning of the ceramic manifolds at the base of the bed and, despite the fact that ceramic materials are brittle, good lifetimes are expected. By employment of short, internal ceramic manifolds serving a plurality of interconnected heat exchange conduits positioned well below the horizontal plane of combustion air injection, there is achieved a minimization of thermal and mechanical stress at the manifold.

By providing only a few ceramic-to-metallic connections, all external to the fluidized bed combustor, field insulation of the units is readily facilitated without the need for making ceramic-to-ceramic joints. In addition, the pressure-containing ceramic-to-metal joints are located outside the heat exchanger enclosure where thermal strain can be readily computed on the basis of the working fluid in the vessel and where analysis is not complicated by internal heat transfer and/or an erosive environment.

The placement of the manifolds of the ceramic heat transfer modules in an inactive bed material permits relatively unrestricted expansion and yet shields them from temperature gradients that would be experienced if they were in the active portion of the bed.

The invention provides the manifolds of modules in an intermediate temperature zone producing less thermal stress than if they were located outside the bed.

Finally, the units are readily replaceable without making ceramic-to-ceramic joints, and without disturbing other modules. They can be, in effect, unplugged from the bottom of the bed of the combustor, lifted out, and replaced by a new unit.

It is understood that what has been described is merely illustrative of the principles of the invention and that numerous arrangements in accordance with this invention may be devised by one skilled in the art without departing from the spirit and scope thereof.

What is claimed is:

1. A fluidized bed combustor comprising:
an insulated chamber having a base;
a fluidized bed contained by said insulated chamber and comprising a lower, stratified zone of compliant, stagnant material and an upper, stratified zone of combusting, carbonaceous material;
means external to said insulated chamber for delivering a flow of fluid to be heated by said fluidized bed;
means external to said insulated chamber for receiving said flow of fluid after having been heated by said fluidized bed; and
a heat exchange module comprising:
a first ceramic inlet manifold situated within said lower stratified zone,
a second ceramic outlet manifold situated within said lower stratified zone,
a plurality of ceramic heat exchange conduits, each ceramic heat exchange conduit coupling said ceramic inlet manifold to said ceramic outlet manifold in open flow communication and extending vertically upwards from said manifolds into said upper stratified zone,
a ceramic inlet conduit extending through said insulated chamber and flowingly connecting said ceramic inlet manifold to said external flow delivering means, and
a ceramic outlet conduit extending through said insulated chamber and flowingly connecting said ceramic outlet manifold to said external flow receiving means.

2. A heat exchange module as claimed in claim 1 in which the ceramic heat exchange conduits are of serpentine configuration.

3. A fluidized bed combustor as claimed in claim 2 wherein said ceramic inlet and outlet conduits are parallel and extend through said insulated chamber at said base.

4. A fluidized bed combustor as claimed in claim 3 wherein said ceramic heat exchange conduits each lie within one of a plurality of parallel planes and said ceramic inlet and outlet manifolds are parallel to one another and are normal to said parallel planes defined by said ceramic heat exchange conduits.

5. A fluidized bed combustor comprising:
(a) an insulated chamber having a lower portion and an upper portion, the lower portion for containing a fluidized bed and including an insulated base having an upper internal surface;
(b) a plurality of air inlets positioned above the upper internal surface of said insulated base;
(c) means for supplying combustion air to said air inlets;
(d) a plurality of ceramic heat exchange modules positioned within said insulated chamber, each of said ceramic heat exchange modules comprising:
(i) a first longitudinal ceramic manifold positioned at or between said upper internal surface and said air inlets;
(ii) a second longitudinal ceramic manifold positioned at or between said upper internal surface and said air inlets;
(iii) a plurality of ceramic heat exchange conduits connecting said first and second longitudinal ceramic manifolds in open flow communication, and extending from said first and second longitudinal ceramic manifolds upwards into said lower portion of the insulated chamber above said air inlets;
(iv) a ceramic fluid inlet conduit in open flow communication with said first longitudinal ceramic manifold, and extending downwards from said first ceramic manifold through said insulated base; and
(v) a ceramic fluid outlet conduit in open flow communication with said second longitudinal ceramic manifold, and extending downwards from said first ceramic manifold through said insulated base;
(e) means external of said insulated chamber and coupled to the ceramic fluid inlet conduits of said plurality of ceramic heat exchange modules for supplying a fluid to be heated in the ceramic heat exchange modules;
(f) means external of said insulated chamber and coupled to the fluid outlet conduits of said plurality of ceramic heat exchange modules for conducting a fluid heated in said heat exchange conduits from said fluidized bed combustor; and
(g) means for supplying a feed of particulate combustible carbonaceous material to said lower portion of the insulated chamber above said first and second ceramic manifolds.

6. A fluidized bed combustor as claimed in claim 5 further including an economizer having a fluid inlet and a fluid outlet positioned in the upper portion of said insulated chamber.

7. A fluidized bed combustor as claimed in claim 6 in which the fluid outlet of said economizer is coupled in flow communication with the ceramic fluid inlet conduits of said plurality of ceramic heat exchange modules.

8. A fluidized bed combustor as claimed in claim 5 wherein the ceramic heat exchange conduits are of serpentine configuration.

9. A fluidized bed combustor comprising:
(a) an insulated chamber having a lower portion and an upper portion, the lower portion for containing a fluidized bed and including an insulated base having an upper internal surface;
(b) a plurality of air inlets positioned above the upper internal surface of said insulated base;
(c) means for supplying combustion air to said air inlets;
(d) a plurality of ceramic heat exchange modules positioned within said insulated chamber, each of said ceramic heat exchange modules comprising:

(i) a first longitudinal ceramic manifold of circular cross-section, positioned at or between said upper internal surface and said air inlets;

(ii) a second longitudinal ceramic manifold of circular cross-section, positioned in substantially parallel relation to said first longitudinal ceramic manifold and at or between said upper internal surface and said air inlets;

(iii) a plurality of ceramic tubular heat exchange conduits connecting said first and second longitudinal ceramic manifolds in open flow communication, and extending from said first and second longitudinal ceramic manifolds upwards into said lower portion of the insulated chamber above said air inlets;

(iv) a ceramic tubular fluid inlet conduit in open flow communication with said first longitudinal ceramic manifold and extending downwards from said first ceramic manifold through said insulated base; and (v) a ceramic tubular fluid outlet conduit in open flow communication with said second longitudinal ceramic manifold and extending downwards from said first ceramic manifold through said insulated base;

(e) means external of said insulated chamber and coupled to the ceramic fluid inlet conduits of said plurality of ceramic heat exchange modules for supplying a fluid to be heated in the ceramic heat exchange modules;

(f) means external of said insulated chamber and coupled to the fluid outlet conduits of said plurality of ceramic heat exchange modules for conducting a fluid heated in said heat exchange conduits from said fluidized bed combustor; and (g) means for supplying a feed of particulate combustible carbonaceous material to said lower portion of the insulated chamber above said first and second ceramic manifolds.

10. A fluidized bed combustor as claimed in claim 9 further including an economizer having a fluid inlet and fluid outlet positioned in the upper portion of said insulated chamber.

11. A fluidized bed combustor as claimed in claim 10 in which the fluid outlet of said economizer is coupled in flow communication with the ceramic fluid inlet conduits of said plurality of ceramic heat exchange modules.

12. A fluidized bed combustor as claimed in claim 9 wherein the ceramic heat exchange conduits are of serpentine configuration.

13. A fluidized bed combustor as claimed in claim 10 wherein the ceramic heat exchange conduits are of serpentine configuration.

14. A fluidized bed combustor as claimed in claim 11 wherein the ceramic heat exchange conduits are of serpentine configuration.

15. A fluidized bed combustor comprising:
(a) an insulated chamber having a lower portion and an upper portion, the lower portion for containing a fluidized bed and including an insulated base having an upper internal surface and a lower external surface;
(b) a plurality of air inlets positioned above the upper internal surface of said insulated base;
(c) means for supplying combustion air to said air inlets;

(d) a plurality of ceramic heat exchange modules positioned within said insulated chamber, each of said ceramic heat exchange modules comprising:
(i) a first longitudinal ceramic manifold positioned at or between said upper internal surface and said air inlets;
(ii) a second longitudinal ceramic manifold positioned at or between said upper internal surface and said air inlets;
(iii) a plurality of ceramic heat exchange conduits connecting said first and second longitudinal ceramic manifolds in open flow communication, and extending from said first and second longitudinal ceramic manifolds upwards into said lower portion of the insulated chamber above said air inlets;
(iv) a ceramic fluid inlet conduit in open flow communication with said first longitudinal ceramic manifold, and extending downwards from said first ceramic manifold through said insulated base; and
(v) a ceramic fluid outlet conduit in open flow communication with said second longitudinal ceramic manifold, and extending downwards from said first ceramic manifold through said insulated base;

(e) a first duct for supplying a fluid to be heated in the ceramic heat exchange modules positioned beneath the lower external surface;

(f) a plurality of first manifolds extruding from said first duct and positioned beneath said lower external surface of said insulated chamber, each of said manifolds coupled in flow relation to several of said ceramic fluid inlet conduits of said plurality of ceramic heat exchange modules;

(g) a second duct for conducting a heated fluid from said ceramic heat exchange modules positioned beneath the lower external surface opposite said first duct;

(h) a plurality of second manifolds extruding from said second duct and positioned beneath said lower external surface of said insulated chamber, each of said manifolds coupled in flow relation to several of said ceramic fluid outlet conduits of said plurality of ceramic heat exchange modules; and (i) means for supplying a feed of particulate combustible carbonaceous material to said lower portion of the insulated chamber above said frist and second ceramic manifolds.

16. A fluidized bed combustor as claimed in claim 15 further including an economizer having a fluid inlet and a fluid outlet positioned in the upper portion of said insulated chamber.

17. A fluidized bed combustor as claimed in claim 16 in which the fluid outlet of said economizer is coupled in flow communication with said first duct.

18. A fluidized bed combustor as claimed in claim 15 wherein the ceramic heat exchange conduits are of serpentine configuration.

19. A fluidized bed combustor as claimed in claim 17 wherein the ceramic heat exchange conduits are of serpentine configuration.

20. A closed-cycle, gas turbine power generation system comprising:
(a) a fluid compressor having a fluid inlet and a fluid outlet;
(b) an expansion turbine coupled in flow relation to the fluid inlet of said fluid compressor;

(c) a first fluidized bed combustor including a fluid heat exchange conduit having an inlet coupled in flow relation to said fluid compressor and an outlet;

(d) a fluidized bed combustor comprising:
 (I) an insulated chamber having a lower portion and an upper portion and an upper portion, the lower portion for containing a fluidized bed and including an insulated base having an upper internal surface;
 (II) a plurality of air inlets positioned above the upper internal surface of said insulated base;
 (III) means for supplying combustion air to said air inlets;
 (IV) a plurality of ceramic heat exchange modules positioned within said insulated chamber, each of said ceramic heat exchange modules comprising:
  (i) a first longitudinal ceramic manifold positioned at or between said upper internal surface and said air inlets;
  (ii) a second longitudinal ceramic manifold positioned at or between said upper internal surface and said air inlets;
  (iii) a plurality of ceramic heat exchange conduits connecting said first and second longitudinal ceramic manifolds in open flow communication, and extending from said first and second longitudinal ceramic manifolds upwards into said lower portion of the insulated chamber above said air inlets;
  (iv) a ceramic fluid inlet conduit in open flow communication with said first longitudinal ceramic manifold, and extending downwards from said first ceramic manifold through said insulated base; and
  (v) a ceramic fluid outlet conduit in open flow communication with said second longitudinal ceramic manifold, and extending downwards from said first ceramic manifold through said insulated base;
 (V) first fluid flow means external of said insulated chamber having an inlet coupled to the outlet of the fluid heat exchange conduit of said first fluidized bed combustor and an outlet coupled to the ceramic fluid inlet conduits of said plurality of ceramic heat exchange modules;
 (VI) an economizer positioned in the upper portion of said insulated chamber, said economizer including a fluid inlet coupled in flow relation to the outlet of said fluid compressor and an outlet coupled in flow relation to said first fluid flow means;
 (VII) second fluid flow means external of said insulated chamber and coupled in flow relation to the fluid outlet conduits of said plurality of ceramic heat exchange modules and said turbine; and
 (VIII) means for supplying a feed of particulate combustible carbonaceous material to said lower portion of the insulated chamber above said first and second ceramic manifolds.

* * * * *

UNITED STATES PATENT AND TRADEMARK OFFICE
CERTIFICATE OF CORRECTION

PATENT NO. : 4,377,072
DATED : March 22, 1983
INVENTOR(S) : John Campbell, Jr., et al It is certified that error appears in the above-identified patent and that said Letters Patent are hereby corrected as shown below:

Column 9, line 6, delete "and an upper portion" first occurrence.

Signed and Sealed this

Fifth Day of July 1983

[SEAL]

Attest:

GERALD J. MOSSINGHOFF

Attesting Officer — Commissioner of Patents and Trademarks